United States Patent [19]
Honsinger et al.

[11] Patent Number: 6,044,156
[45] Date of Patent: Mar. 28, 2000

[54] METHOD FOR GENERATING AN IMPROVED CARRIER FOR USE IN AN IMAGE DATA EMBEDDING APPLICATION

[75] Inventors: Chris W. Honsinger, Webster; Majid Rabbani, Pittsford, both of N.Y.

[73] Assignee: Eastman Kodak Company, Rochester, N.Y.

[21] Appl. No.: 08/848,112

[22] Filed: Apr. 28, 1997

[51] Int. Cl.[7] .................................................. H04Q 9/00
[52] U.S. Cl. ............................................................ 380/54
[58] Field of Search ........................ 380/54, 55; 382/232

[56] References Cited

U.S. PATENT DOCUMENTS

| | | | |
|---|---|---|---|
| 5,689,587 | 11/1997 | Bender et al. | 380/54 |
| 5,710,834 | 1/1998 | Rhoads | 380/55 |
| 5,793,870 | 8/1998 | Conley | 380/54 |
| 5,822,432 | 10/1998 | Moskowitz et al. | 380/54 |
| 5,825,892 | 10/1998 | Braudaway et al. | 380/54 |
| 5,850,481 | 12/1998 | Rhoades | 382/232 |
| 5,875,249 | 2/1999 | Mintzer et al. | 380/54 |
| 5,894,521 | 4/1999 | Conley | 380/54 |

OTHER PUBLICATIONS

William H. Press, et al., "Numberical Recipes in C, The Art of Scientific Computing," pp. 403–418, Cambridge University Press (1993).

Federal Information Processing Standards Publication No. 180, "Secure Hash Standard," May 11, 1993, pp. 1–20.

William K. Pratt, "Digital Image Processing," Second Edition, pp. 196–200, (1991).

Alan V. Oppenheim and Ronald W. Schafer, "Digital Signal Processing," Prentice–Hall, Inc., pp. 101–115 (1975).

Bruce Schneier, "Applied Crytography, Second Edition, Protocols, Algorithms, and Source Code in C," pp. 369–395 (1996).

*Primary Examiner*—Salvatore Cangialosi
*Attorney, Agent, or Firm*—David M. Woods

[57] ABSTRACT

A message is embedded into a digital image by forming a digitized version of the message and convolving the digitized message with a random phase carrier to form a scrambled message. The scrambled message is then combined with the digital image to form an embedded message image that is near impossible to extract without knowledge of the formation of the random phase carrier.

19 Claims, 7 Drawing Sheets

METHOD FOR GENERATING AN IMPROVED CARRIER FOR USE IN AN IMAGE DATA EMBEDDING APPLICATION

CROSS-REFERENCE TO RELATED APPLICATIONS

The present application is related to U.S. application Ser. No. 08/565,804, filed Nov. 30, 1995, by Scott J. Daly et al., and entitled, "Method For Embedding Digital Information In An Image;" U.S. application Ser. No. 08/596,818, filed Feb. 5, 1996, by Scott J. Daly, and entitled, "Method and Apparatus for Hiding One Image or Pattern Within Another;" and to U.S. application Ser. No. 08/768,679, filed Dec. 18, 1996, by Chris W. Honsinger et al. and entitled, "Method for Detecting Rotation and Magnification in Images."

FIELD OF THE INVENTION

The invention relates generally to the field of image processing, and in particular to a method of embedding normally non-visible information in an image.

BACKGROUND OF THE INVENTION

In U.S. patent application Ser. No. 08/565,804 a technique has been described for embedding digital data in images that can be implemented either digitally or optically. This technique is aimed at satisfying the requirements that it will not visibly distort the image, it is not easily corrupted by the image content or defects, and that it is robust to basic image processing tasks such as filtering, cropping, rotation, resizing, or compression.

This technique of embedding digital message data in a source image includes the steps of: a) generating a multi-level message data image representing the digital message data; b) convolving the multi-level message data image with an encoding carrier image to produce a scrambled message data image; and c) adding the scrambled message data image to the source image to produce a source image containing embedded data. The message data is recovered from the source image containing embedded image data by: a) cross correlating the source image containing embedded data with a decoding carrier image to recover the message data image; and b) extracting the digital message data from the recovered message data image.

In the above invention, the preferred carrier signal is defined as a frequency modulated (FM) sinusoid. In particular, the FM signal is modulated in a radially symmetric fashion to accommodate the possibility that the image has been rotated. Further, the frequency undulation of the carrier as a function of distance from the center of the carrier is defined as either a linear or a logarithmic undulation function, wherein the logarithmic function is the preferred undulation function due to its robustness to small image scale changes.

However, the above invention has several shortcomings. First, because the carrier signal is deterministic, it is conceivable that a user of the images produced by the method of U.S. patent application Ser. No. 08/565,804 may deduce the carrier undulation function used in the data hiding process. Once the carrier function is understood it may be possible to subtract out the embedded data from the image. This is particularly a disadvantage when one intent of the process is to embed copyright or other secret messages.

Additionally, in the afore referenced patent application, it can be shown that the frequency amplitude spectrum of the carrier is not constant. As a result, the autocorrelation function of the frequency modulated (FM) sinusoid is not a delta function and has strong sidelobes. This has a negative influence on the quality of the extracted message data. In fact, as explained in that patent application, optimum data extraction is achieved only if the autocorrelation function of the carrier signal is an exact delta function.

SUMMARY OF THE INVENTION

The present invention is directed at overcoming the problems set forth above. In particular, the present invention provides a solution to the problem of achieving an optimal carrier while simultaneously achieving a secure messaging system. Briefly summarized, according to one aspect of the present invention, a method for embedding a message into a digitized image is disclosed comprising the steps of: forming a digitized version of the desired message; generating a random phase carrier; convolving said formed digitized version of the desired message and said generated random phase carrier to form a scrambled message; and combining said scrambled message with the digitized image to form an embedded message image.

Function wise, the improved carrier signal of the present invention is designed in the Fourier frequency domain. In the Fourier domain, the value of the signal at each frequency is characterized by a complex number that can be represented as either a real/imaginary pair or as an amplitude/phase pair. The carrier signal is designed in Fourier domain in such a way that the carrier's amplitude at each frequency is a constant and the carrier's phase at each frequency is a random number that is uniformly distributed between 0 and 360 degrees. The autocorrelation of such a carrier signal has a shape resembling a delta function, which, as described later in the present invention, improves the integrity of the recovered message.

In a preferred embodiment of the present invention, the random phase of the carrier is constructed by using the output of a stream cipher encryption system. As a result, it will be practically impossible for any unauthorized person who does not have access to the private key of the encryption system to duplicate the carrier function. Furthermore, in those cases when copyright protection is also desired, the private key can be made a function of the original image prior to data embedding such as the hashed value of the original image or certain other attributes of the original image. Since only the original owner has access to the original image, no one else can recover the key. Of course, in those applications where the secrecy of the carrier is not required, a known key can be used to generate the random stream of bits using the same random number generation system.

These and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
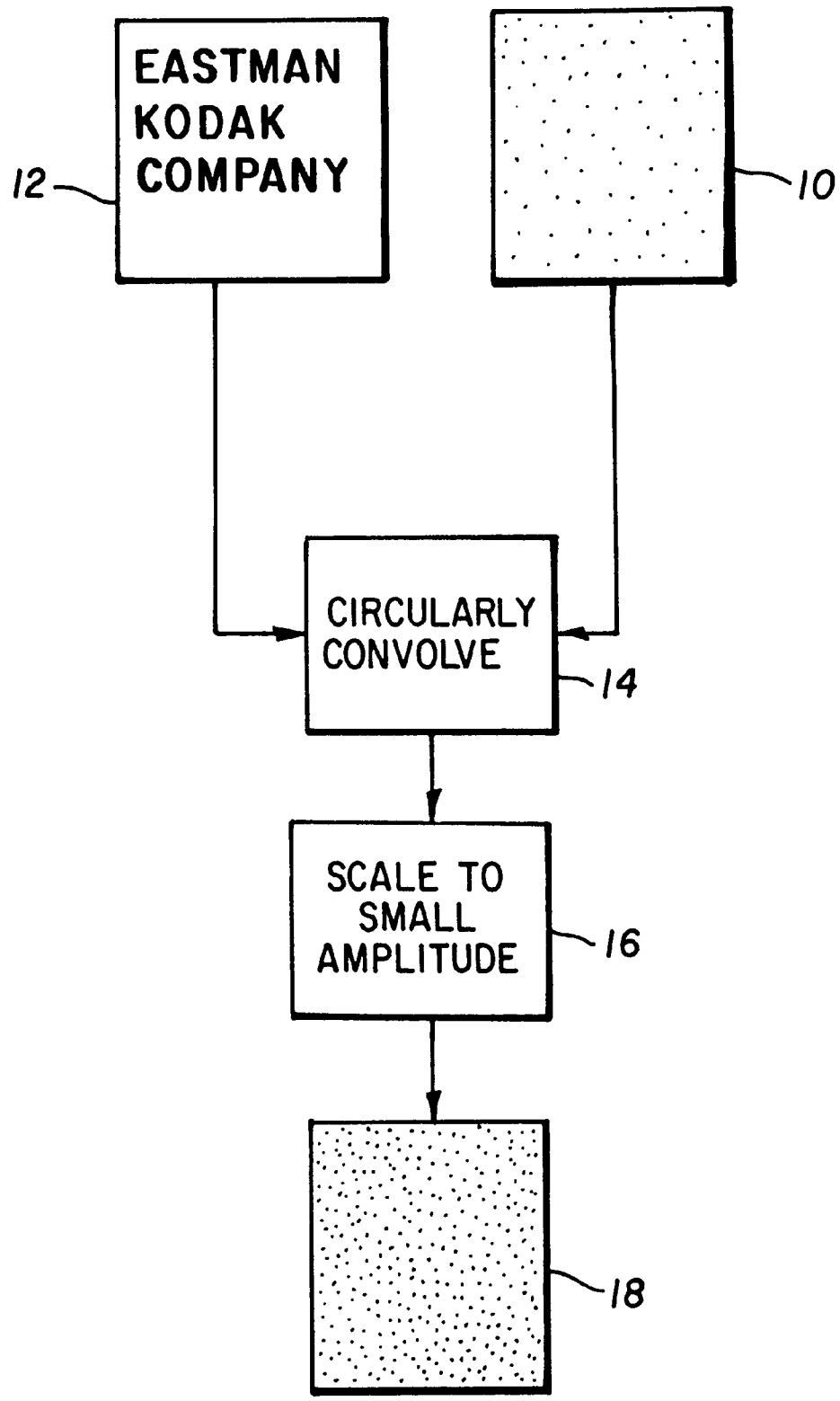
FIG. 1 is a block diagram illustrating the overall operation of the present invention to derive a scrambled message.

The technique described in the afore referenced patent application for forming non-visible information (message) in an image may be broken down into two parts, the process of embedding the message into an image and the process of extracting the message after the image has been used.

In the embedding part, the message and the carrier are convolved to form a scrambled signal. The scrambled signal then is scaled to ensure that the amplitude of the resultant scrambled message is not visually perceptible. Finally, the scrambled message is added to the image. In a preferred embodiment of that and the present invention, the specific form of the convolution operation is referred to as circular convolution (see "Digital Signal Processing" by Alan V. Oppenheim and Ronald W. Schafer, Prentice-Hall, Inc., pp-101–115) which can be efficiently performed in either space domain (image domain) or Fourier frequency domain representations. The process of data embedding can be mathematically described as $$I'(x,y)=I(x,y)+\alpha(M(x,y)*C(x,y))$$

where $I(x,y)$ denotes the original image, $I'(x,y)$ denotes the final image containing the embedded data, $M(x,y)$ denotes the message that is to be embedded in the original image, $C(x,y)$ denotes the carrier signal, $M(x,y)*C(x,y)$ denotes the scrambled image, $\alpha$ is scale factor, and * denotes the process of circular convolution.

It should be noted that the convolution of the carrier with the message distributes the message information throughout the spatial extent of the scrambled signal. The amplitude $\alpha$ is chosen to be small enough so that the message is visually undetectable to, but large enough to be recoverable by the message extraction process. That is, the value of $\alpha$ is chosen in such a way that the maximum amplitude of the embedded signal does not exceed a pre-specified threshold. When dealing with 8-bit images where the pixel codevalues range from 0–255, we have found a threshold of 10 codevalues to be adequate to render the embedded message invisible in most cases.

To extract the hidden message, the image $I'(x,y)$ is cross correlated with a replica of the carrier, $C(x,y)$, as described by the following:

$$M'(x,y)=I'(x,y)\otimes C(x,y)$$

where $\otimes$ denotes the operation of circular cross correlation. Replacing $I'(x,y)$ with the embedding equation above yields:

$$M'(x,y)=[I(x,y)+\alpha M(x,y)*C(x,y)]\otimes C(x,y)=$$

$$=I(x,y)\otimes C(x,y)+\alpha M(x,y)*[C(x,y)\otimes C(x,y)]$$

The above relationship simply states that the recovered message consists of the sum of two components, one term is the cross-correlation of the original image with the carrier signal, and the second term is the autocorrelation of the carrier signal convolved with a scaled version of the original message. The effect of the first term can be minimized by creating a random carrier that is uncorrelated with the original image. From examining the second term, it is clear that the resolvability of the recovered message is affected by the autocorrelation of the carrier signal $C(x,y)$. Ideally, to achieve maximum resolvability, the autocorrelation of the carrier signal should be a delta function, $\delta(x,y)$, which from Fourier analysis theory is equivalent to suggesting that the carrier signal should contain all frequencies at equal amplitude.

In summary, in order to have $M'(x,y)$ match $M(x,y)$ as closely as possible, it is required that $$I(x, y) \otimes C(x, y) \approx 0, \text{ and } C(x, y) \otimes C(x, y) \approx \delta(x, y)$$

where $\delta(x,y)$ is a Dirac delta function.

In the present invention starting with FIG. 1, the carrier signal $C(x,y)$ is constructed in the Fourier domain and illustrated as a flat spectrum/random-phase two dimensional array 10. The details of that construction will be explained with the description of FIG. 6. The two dimensional array is circularly convolved with the message 12 in block 14. In block 16 of FIG. 1, the output of block 14 is scaled to an amplitude of approximately 1/25 of the amplitude of the maximum pixel values in the image to form the scrambled message 18.

Figure 2A:
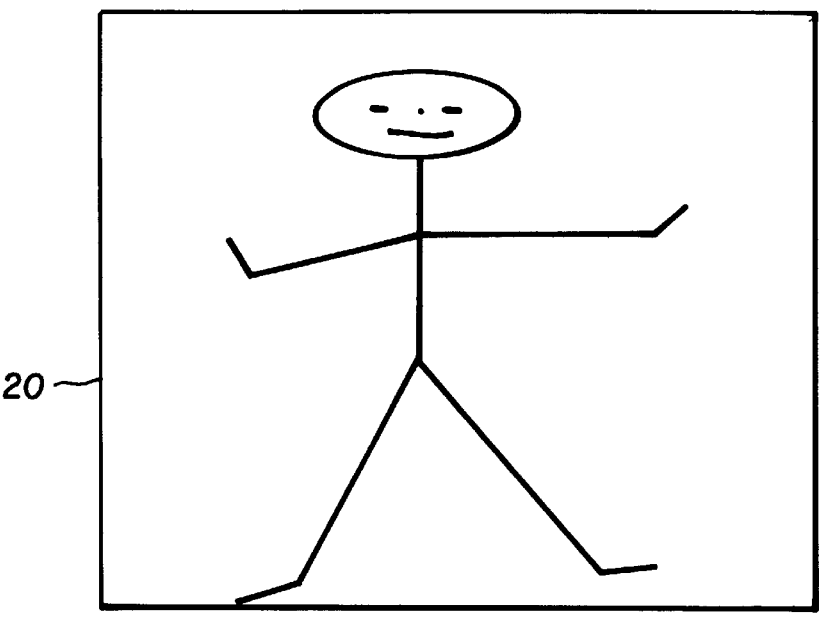
FIG. 2A illustrates a digitized image to which the normally non-visible information (scrambled message) is to be added.
Figure 2B:
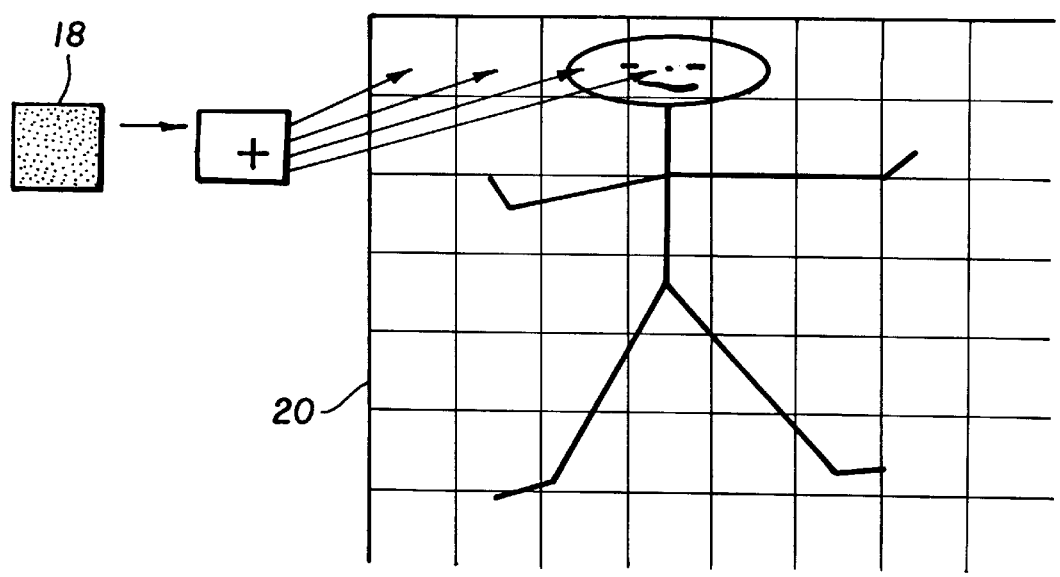
FIG. 2B illustrates the addition of the scrambled message, in a tiled fashion, to the digitized image.

FIG. 2A represents an image 20 to which the message is to be added. FIG. 2B illustrates the addition of the scrambled message 18 to the image 20 in a tiled fashion. Although tiling is used for the preferred embodiment it is well within the teachings of the present invention to add one or more larger scrambled messages to cover the entire image 20. In a like manner, a smaller scrambled message or messages could be added to the image at key spots without covering the entire image.

Figure 7:
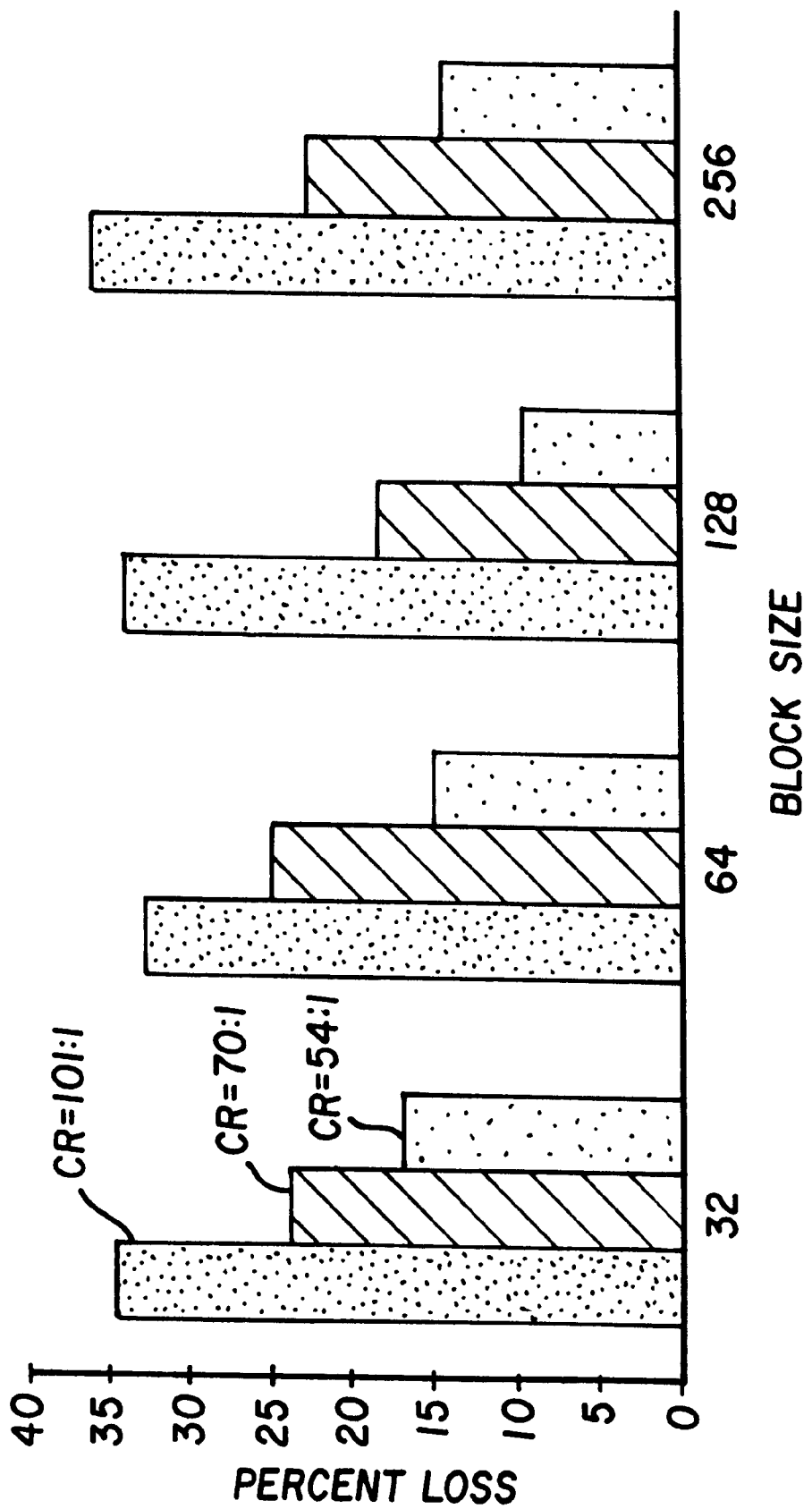
FIG. 7 is a bar chart illustrating the results of using different block sizes (tile sizes)

Preferred tile size data is presented in the bar chart of FIG. 7, which characterizes the number of message bits lost as a percentage of the total embedded bits due to image compression at various compression ratios. This chart suggests that a tile size of 64×64 or 128×128 is optimal. Similar results may be obtained when other conventional operations are performed on the image such as low-pass filtering or noise addition.

Figure 3:
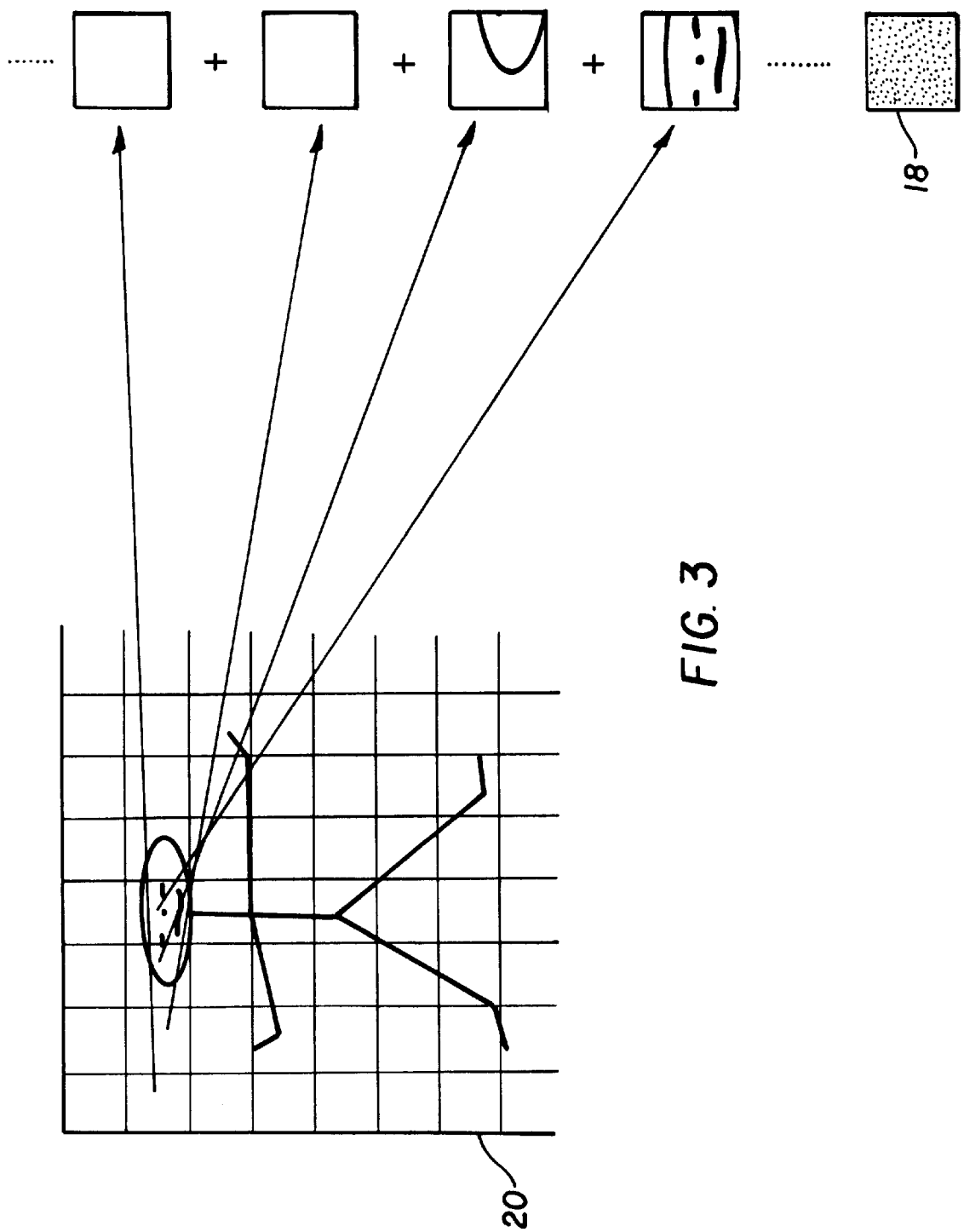
FIG. 3 illustrates the method for recovering the scrambled message.

FIG. 3 represents the first stage of message recovery. Using the same tile grid as in FIG. 2B, the scrambled message 18 is extracted from the embedded image 20 by adding each tile section to the sum of the preceding tile sections. As a result of this operation, the image components add destructively and the scrambled message components add constructively.

Figure 4:
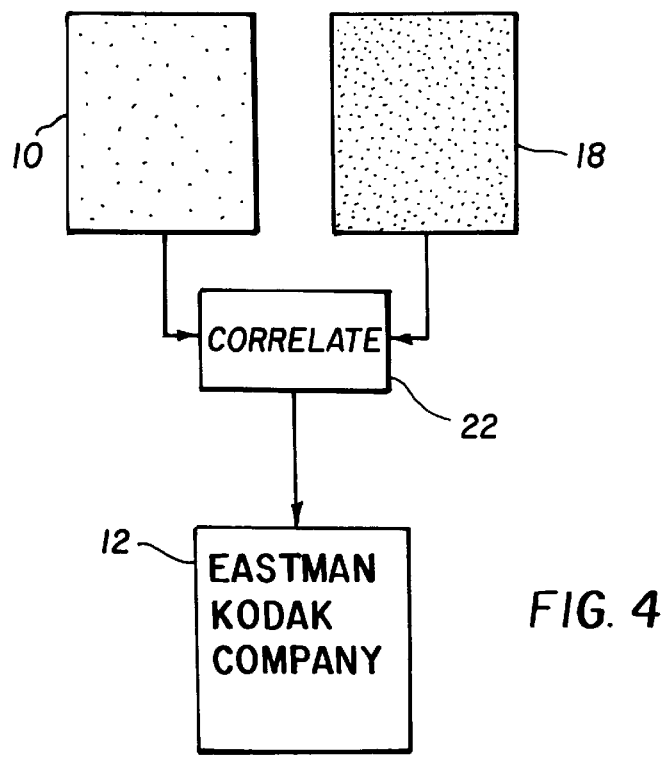
FIG. 4 illustrates in block diagram form the method of recovering the message from the scrambled message.

Referring to FIG. 4, the scrambled message 18 (sum of sections) is correlated with the flat spectrum/random phase two dimensional array 10 in block 22 to output the original message 12.

The improved carrier is constructed in the Fourier frequency domain. Source code generated in the computer language C++ is provided in Appendix I. As discussed earlier, it is desirable to ensure that the amplitude spectrum is constant or flat so that the auto-correlation of the carrier approximates a delta function. The Fourier phase of the spectrum should be random to simultaneously provide a basis for a cryptographically secure system and to ensure that the message data is spatially dispersed after convolution with the carrier.

To construct a Fourier spectrum with these properties, we first note that the numbers in the Fourier domain are complex quantities, possessing both real and imaginary values. Alternatively, a complex number can be represented by its phase and magnitude. Given a complex quantity $F(u,v)$ at the frequency location $(u,v)$, the real and imaginary parts of $F(u,v)$ may be related to its phase and magnitude by the following simple formulas:

$$Re(F(u,v)) = Magnitude * cos(phase)$$

$$Im(F(u,v)) = Magnitude * sin(phase)$$

Figure 5:
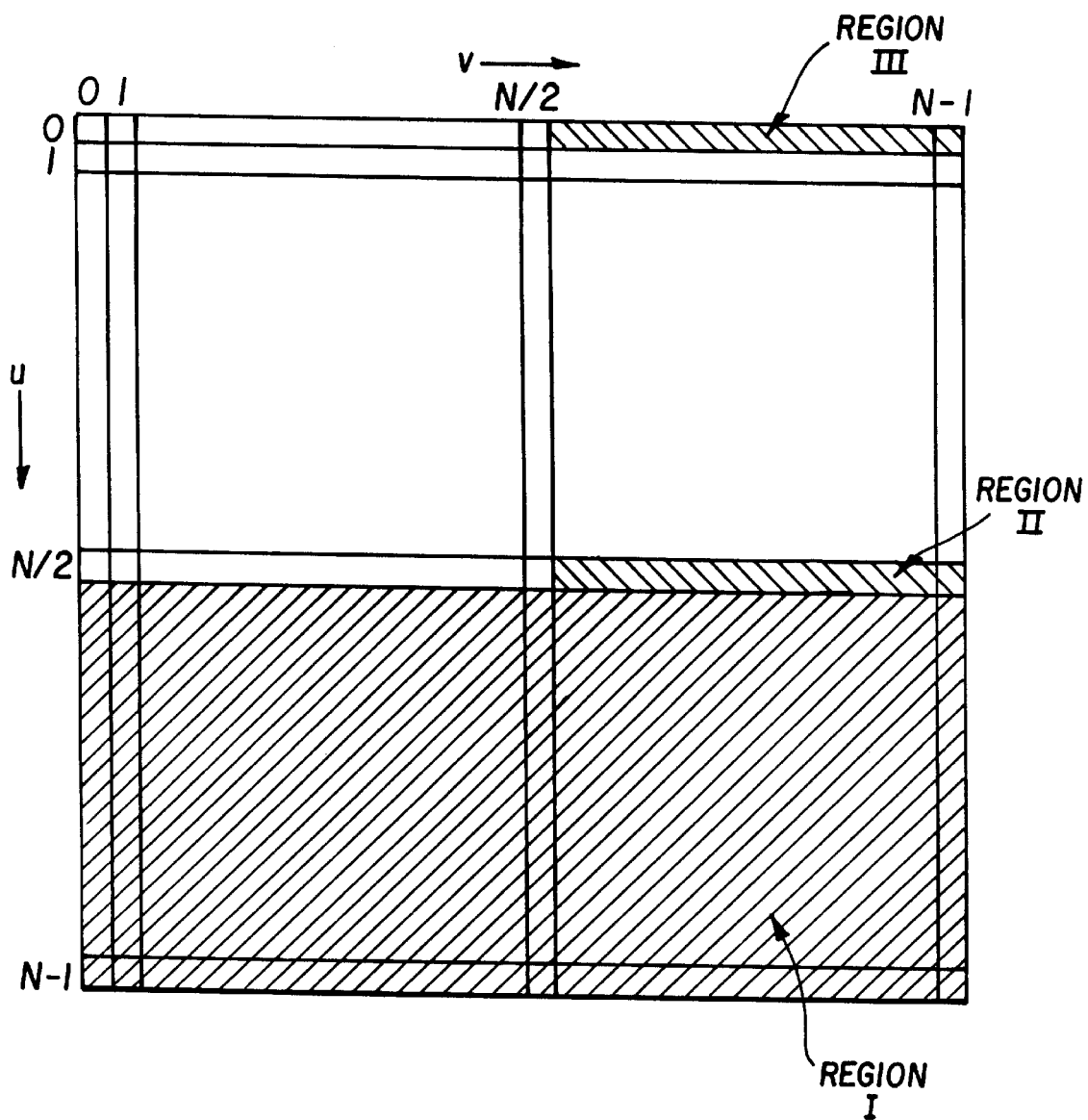
FIG. 5 illustrates the redundant and the non-redundant parts of a Fourier transform subject to Conjugate Symmetry constraint in the frequency domain.

Consequently, setting the magnitude of the Fourier frequency components to unity at all frequencies will result in a flat spectrum. Also, since we wish the carrier data to be real, we impose on its Fourier transform an additional constraint known as Conjugate Symmetry (see "Digital Image Processing," by William K. Pratt, Second Edition, pp. 196–200) as defined below:

$$F(u,v) = F^*(-u+mN, -v+nN),$$

where $F^*$ denotes the operation of taking the complex conjugate of F, N is the block size of the carrier (equal to 128 here), and $m,n = 0, \mp 1, \mp 2, \mp 3, \ldots$ The Conjugate Symmetry constraint implies that only about half of the Fourier components need to be specified, and that the remaining half may be constructed based on the symmetry conditions. The Conjugate Symmetry property is illustrated in FIG. 5 where the cross-hatched region shows the nonredundant components of the transform and the remaining region designates the redundant components. As a result, to generate a carrier with the desired properties, we need only specify the phase and the amplitude of the non-redundant portions of the Fourier transform and compute the rest of the components by using the appropriate values of m and n in the Conjugate Symmetry relationship described above.

Figure 6:
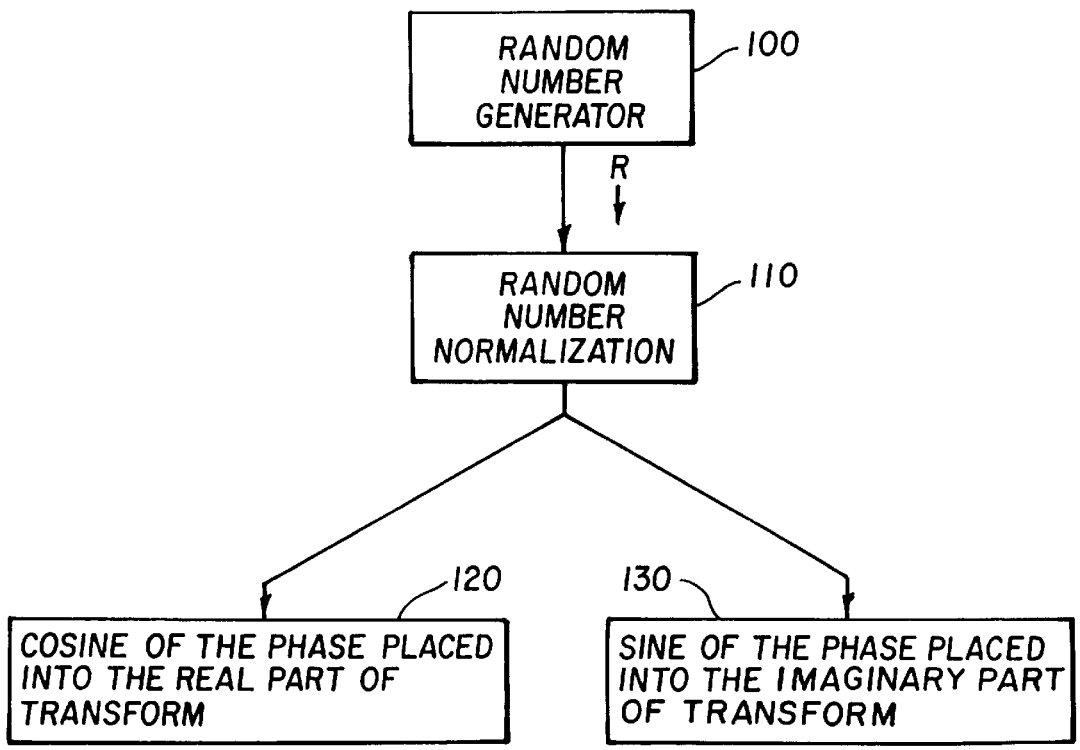
FIG. 6 illustrates in flow diagram form the method for generating the improved carrier of the present invention.

FIG. 6 contains the details of the method for forming the improved carrier. For each location in the non-redundant part of the transform, a random number is chosen from a random number generator 100.

A preferred method of specifying this random phase is to first use a private-key encryption system to generate a stream cipher that resembles a random bit stream. One example of a stream cipher is a scheme called RC-4™, a commercially available product from RSA Data Security Inc. Further examples of methods used to generate cryptographically strong stream ciphers based on nonlinear combinations of linear feedback shift registers are described in the reference titled APPLIED CRYPTOGRAPHY, SECOND EDITION, PROTOCOLS, ALGORITHMS, AND SOURCE CODE IN C, "Pseudo-Random-Sequence Generators and Stream Ciphers," by Bruce Schneier, 1996, pp 369–395.

In a cryptographically strong cryptosystem it is computationally infeasible to generate the random bit stream unless the private key is known. By making the private key available only to the authorized users, it can be assured that the carrier signal cannot be duplicated by any unauthorized user. Next, the random bit stream that is generated by the stream cipher is converted into a random phase for the carrier signal at a given frequency. Depending on the accuracy desired, the bit stream can be blocked into N-bit blocks and each block of N bits is mapped into a number that is uniformly distributed between 0 and 360 degrees. For example, for N=10, the interval between 0 and 360 degrees can be divided into 1024 equal subintervals, where each subinterval is randomly (and with a uniform probability) chosen based on the 10-bit value.

Finally, in certain applications it may be desirable to create an encryption private key that depends on the original image values. This is particularly useful for those cases when an author creates an image and wishes to embed a copyright or another form of data in that image to prove ownership at a later time. In this case, an image-dependent key is generated and used to embed the data in the image according to the procedure described above. The user then locks the original image in a safe place and only makes available the watermarked image to the public. By making the key dependent on the original image, the user not only precludes unauthorized users from duplicating the carrier signal, but he can also use the original image (which only he could have had access to) in the court to produce the key and thus prove his ownership. One method of generating a key that depends on the original image is to hash the image through a one-way hashing algorithm (see "Secure Hash Standard" U.S. Department of Commerce Technology Administration National Institute of Standards and Technology, FIPS PUB 180, May 11, 1993, pp 1–20) to generate a fixed-sized hashed value that can then be used as the private key of the encryption algorithm.

The output of the random number generator 100 is normalized in block 110 to ensure it spans between 0 and 360 degrees in phase, or equivalently, between 0 and $2\pi$ radians 110. The cosine of the phase is placed into the real part of the transform 120 and sine of the phase 130 is placed into the imaginary part of the transform. It should be mentioned that the Fourier amplitude is automatically flat since the amplitude is:

$$\text{Amplitude} = \sqrt{\text{real}^2 + \text{imagery}^2} = \sqrt{\cos(\text{phase})^2 + \sin(\text{phase})^2}$$
$$= 1$$

To calculate values for the redundant part of the Fourier spectrum, use the Conjugate Symmetry Formula above. This assumes that the non-redundant part of the transform has been calculated. FIG. 5 shows that the redundant part of the transform may be divided into three regions, Region I, Region II, and Region III. The values m and n in the Conjugate Symmetry Formula must be specified in advance and must ensure that the resultant arguments in the term, $F^*(-u+mN,-v+nN)$, correspond to a non-redundant region. The following is a specification for m and n which works for all values of N:

The lower region, Region I, of the redundant part of the spectrum is calculated using m=1 and n=1 in the Conjugate Symmetry Formula. Region II appears on the middle right side of FIG. 5. This region is also be calculated by using m=1 and n=1 in the Conjugate Symmetry Formula. Region III appears on the upper right side of FIG. 5. This region is calculated by using m=0 and n=1 in the Conjugate Symmetry Formula.

As a further refinement, it is known that the Fourier amplitude spectrum of imagery is much larger in the very lowest frequencies when compared to their higher frequencies. Since the cross-correlation process (message extraction) may be described in the Frequency domain as the product of two functions' amplitude spectrums and the subtraction of their respective phases, the impact of the image on the recovered message may further be reduced by reducing the Fourier amplitude of the lowest frequencies of the carrier. The preferred embodiment of this improvement is to increase the amplitude from zero amplitude to a constant value (here the constant value is 1.0) starting at DC (or zero frequency) to 1/16th of Nyquist frequency. In our software implementation, the frequency arrangement shown in FIG. 5 is rearranged so that DC (or zero frequency) occurs at the center of the spectrum at point (N/2,N/2). This rearrangement may be effected by temporarily interchanging the lower right quadrant with the upper left quadrant and interchanging the lower left quadrant with the upper right quadrant. This enables us to directly express frequency as a function of distance from (N/2,N/2), whereas in the former frequency arrangement, references to each quadrant must be dealt with independently. Given this arrangement, our algorithm first introduces a variable called ramp radius which is equal to the value: Nyquist/16, which for N=128, is equal to 4 calculates for each frequency (u,v) less than rampradius:

1) The distance, radius, from DC:

$$\text{radius} = \sqrt{(u - N/2)^2 + (v - N/2)^2}$$

2) A value:

multiplier=$(1-(\text{rampradius}-\text{radius})/\text{rampradius})^2$

3) A modified value for F(u,v):

$Real(F(u,v)) = \text{multiplier} \times Real(F(u,v))$ $Imaginary(F(u,v)) = \text{multiplier} \times Imaginary(F(u,v))$ In practice, by constructing the carrier with the methods described in the present invention, the carrier will be uncorrelated with the image and hence the effect of the cross-correlation of the image and the carrier on the recovered image will be negligible.

Figure 8:
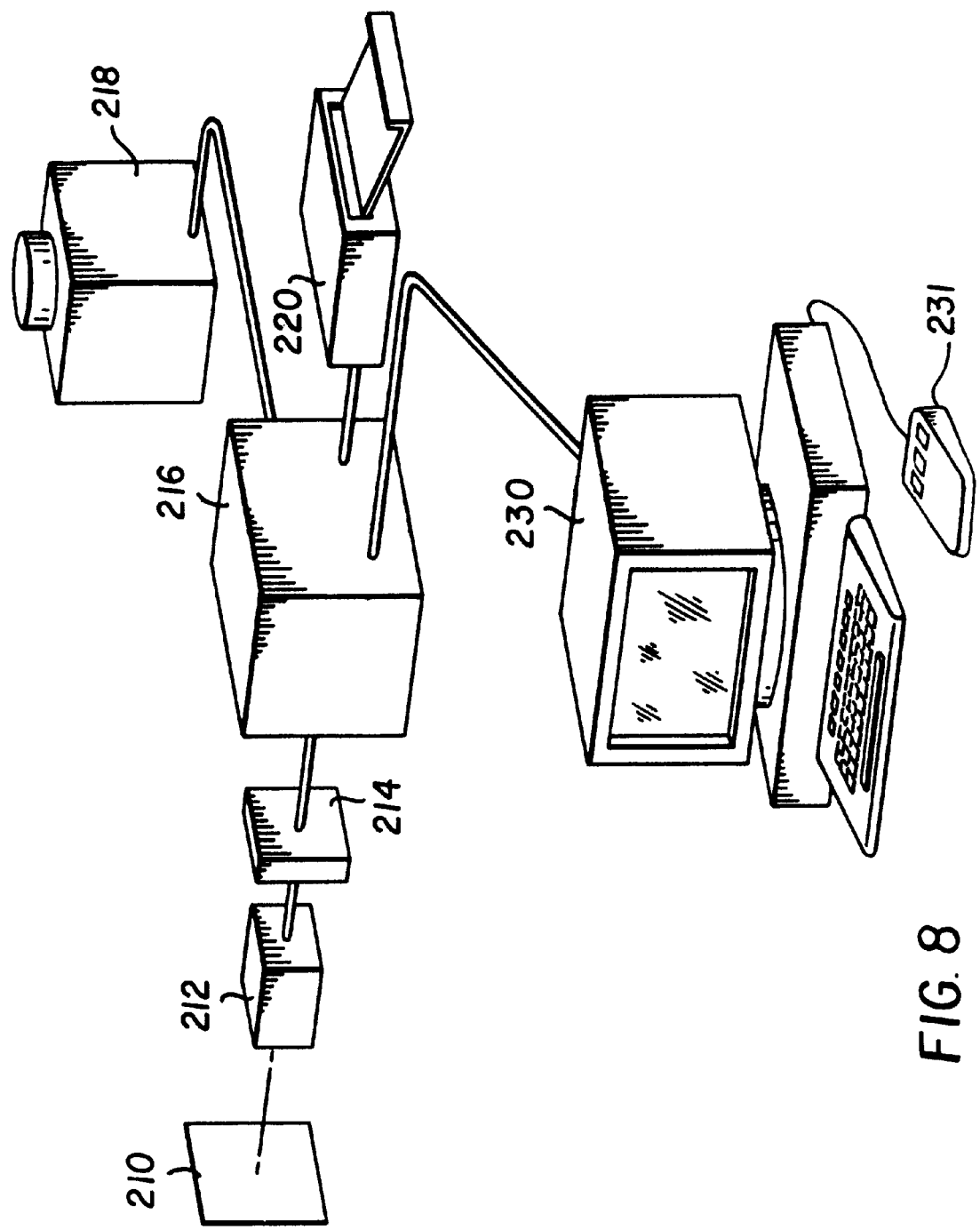
FIG. 8 illustrates in block diagram form a digital image processing system on which the present method may be implemented.

Referring to FIG. 8, a system on which the present invention is practiced scans an image 210, via a scanner 212 and converts the scanned image to a digital image using an analog-to-digital converter 214. The analog-to-digital converter 214 may be part of the scanner 212. The digitized image is forwarded to a processor 216 wherein it is operated upon in accordance with the software (algorithm) of the present invention. A monitor 230 and mouse 231, or other input device, enables an operator to interface with the image in its digital form. The processed image may be stored in a memory 218 and/or printed out using a printer 220.

The invention has been described with reference to a preferred embodiment; However, it will be appreciated that variations and modifications can be effected by a person of ordinary skill in the art without departing from the scope of the invention.

APPENDIX I

Source Code To Produce An Improved Carrier Signal

```
#include "image.h"
double pi2=8.*atan(1.);
#define get_rand() (double)pi2*rand()/(RAND_MAX)
void main(int argc, char *argv[])
{
    if(argc<2)
    {
        printf("\n\nUsage: carrier random_seed block_size [ramp_radius]\n");
        exit(1);
    }
    else
    {
        int random_seed = atoi( argv[1]);
        int block_size = atoi(argv[2]);
        double val,r,i,r1,i1;
        int p,1,pp=block_size,p2=block_size/2;
        int 11=block_size,12=block_size/2;
        //Initialize an image w/ 1 color plane, pp pixels wide, 11 lines long
        //and 32 bits per pixel deep (floating point)
        //This image will be used to store imaginary values
        image imaginary(1,pp,11,32);
        //Initialize an image w/ 1 color plane, pp pixels wide, 11 lines long
        //and 32 bits per pixel deep (floating point)
        //This image will be used to store real values
        image real(1,pp,11,32 );
        //Initialize the random number generator
        srand(random_seed);
        //The Fourier amplitude spectrum of imagery is much larger in the
        //very lowest frequencies when compared to their higher
        //frequencies. Since the cross-correlation process (message
        //extraction) may be described in the Frequency domain as the
        //product of two functions' amplitude spectrums and the
        //subtraction of their respective phases, the impact of the image on
        //the recovered message may further reduced by making the
        //carriers' Fourier amplitude of the lowest frequencies smaller.
        //Initalize the bounding radius
        double ramp_radius=0;
        if(argc==4) ramp_radius=atof(argv[3]);
        printf("\nShall start zeroring frequencies at r=0.0 and end at r = %15.5f\n", ramp_radius);
        double x;
        int ix,iy;
        double vx,vy;
        //"1" represents line position
        //"p" represents pixel position
        //Fill in non-redundant upper quadrants
        //Go ahead an fill in small strip in upper right
        //quadrant which is redundant since it will be
        //overwritten anyway in the next loop
        for(1=0;1<=12;1++)
        {
            for(p=0;p<block_size;p++)
            {
                x=(double) pi2*rand()/(RAND_MAX);
                vx = cos(x);
                vy = sin(x);
                real.put_pixel(vx,0,p,1);
                imaginary.put_pixel(vy,0,p,1);
            }
        }
        //Fill in strip in upper right quadrant which is redundant
        //i.e. (block_size/2+1,0)->(block_size-1,0)
        //Set line number to zero
        1=0;
        for(p=(block_size/2+1);p<block_size;p++)
        {
            //Get a mirrored point from left
            vx=real.get_pixel(0,block_size-p,0-1);
            vy=-imaginary.get_pixel(0,block_size-p,0-1);
            real.put_pixel(vx,0,p,1);
            imaginary.put_pixel(vy,0,p,1);
        }
```

APPENDIX I-continued

Source Code To Produce An Improved Carrier Signal

```
//Fill in redundant lower two quadrants
for( 1=(12+1);1<block_size; 1++)
{
    for(p=0;p<block_size;p++)
    {
        vx=real.get_pixel(0,block_size-p,block_size-1);
        vy=-imaginary.get_pixel(0,block_size-p,block_size-1);
        real.put_pixel(vx,0,p,1);
        imaginary.put_pixel(vy,0,p,1);
    }
}
//Finish up by filling redundant strip (block_size/2+1,block_size/2)- //
>(block_size-1,block_size/2)
    //Set line number to zero
    1=block_size/2;
    for(p=(block_size/2+1);p<block_size;p++)
    {
        vx=real.get_pixel(0,block_size-p,block_size-1);
        vy=imaginary.get_pixel(0,block_size-p,block_size-1);
        real.put_pixel(vx,0,p,1);
        imaginary.put_pixel(vy,0,p,1);
    }
    //Now orient the data so that DC appears at the center
    real.orient();
    imaginary.orient();
    double radius=0.0;
    if(ramp_radius>0)
    {
        printf("\nBuilding quadratic ramp\n");
        for(1=0;1<11;1++)
        {
            for(int p=0;p<pp;p++)
            {
                radius = (p-p2)*(p-p2)+(1-12)*(1-12);
                radius = pow( radius, .5);
                if(radius <=ramp_radius)
                {
                    val= real.get_pixel( 0,p,1);
                    val *= pow((1.0-(ramp_radius -
                        radius )/ramp_radius),2);
                    real.put_pixel(val,0,p,1);
                    val= imaginary.get_pixel( 0,
                        p,1):
                    val *= pow((1.0-(ramp_radius -
                        radius )/ramp_radius),2);
                    imaginary.put_pixel(val,0,p,1);
                }
            }
        }
    }
    //Take the inverse fourier transform
    _fft(&real,&imaginary,-1);
    //Note that the above function _fft(&real,&imaginary,-1)
    //has replaced the images real and imaginary with the inverse
    //fourier transform -- so all we have to do is save the image real.
    char out[128];
    sprintf(out, "carrier.tif");
    real.save(out);
}
```

What is claimed is:

1. A method for embedding a message into a digitized image comprising the steps of:
   a) forming a digitized version of the desired message;
   b) generating a random phase carrier;
   c) convolving said formed digitized version of the desired message and said generated random phase carrier to form a scrambled message; and
   d) combining said scrambled message with the digitized image to form an embedded message image.

2. A method for embedding a non-visible message into a digitized image comprising the steps of:
   a) forming a digitized version of the desired message;
   b) generating a random phase carrier;
   c) convolving said formed digitized version of the desired message and said generated random phase carrier to form a scrambled message; and
   d) combining said scrambled message with the digitized image to form an embedded non-visible message image.

3. The method according to claim 2 wherein the generated random phase carrier is a flat spectrum random phase carrier.

4. The method according to claim 3 wherein the flat spectrum random phase carrier is generated in a complex Fourier space of constant amplitude and random phase.

5. A method for embedding a message into a digitized image incorporating a cryptographically secure carrier signal comprising the steps of:
   a) generating a random phase carrier signal incorporating a private key;
   b) convolving a message with said generated random phase carrier signal to form a scrambled message; and
   c) combining said scrambled message with the digitized image to form an embedded message image.

6. The method according to claim 5 wherein said message is not visible in the embedded message image.

7. The method according to claim 2 wherein said convolving step is performed with a circular convolver.

8. The method according to claim 2 wherein said scrambled message is tiled across the digitized image.

9. The method according to claim 8 wherein the digitized version of the desired message is recovered by summing the contents of each tile together such that digitized message components add constructively and image components add destructively.

10. A method of embedding a message in a source image, comprising the steps of:
    a) convolving the message with an encoding carrier to produce a scrambled message; and
    b) adding the scrambled message to the source image to produce a source image containing an embedded scrambled message.

11. The method according to claim 10, and further comprising the steps of:
    a) cross correlating the source image containing a scrambled message with a decoding carrier to recover the embedded scrambled message; and
    b) extracting the message from the scrambled message.

12. The method according to claim 11, wherein the decoding carrier is identical to the encoding carrier image.

13. The method according to claim 10, wherein the decoding and encoding carriers are random with a private key.

14. A method for embedding a non-visible message into a digitized image comprising the steps of:
    a) forming a digitized version of a desired multi-bit message;
    b) generating a random phase carrier consisting of a single carrier image;
    c) convolving said formed digitized version of the desired multi-bit message and said carrier image to form a single scrambled message; and
    d) combining said scrambled message with the digitized image to form an embedded message image.

15. The method according to claim 14 wherein the generated random phase carrier is a flat spectrum random phase carrier.

16. The method according to claim 15 wherein the flat spectrum random phase carrier is generated in a complex Fourier space of constant amplitude and random phase.

17. The method according to claim 14 wherein said convolving step is performed with a circular convolver.

18. The method according to claim 14 wherein said scrambled message is tiled across the digitized image.

19. The method according to claim 14 wherein the digitized version of the desired message is recovered by summing the contents of each tile together such that digitized message components add constructively and image components add destructively.

* * * * *

UNITED STATES PATENT AND TRADEMARK OFFICE
CERTIFICATE OF CORRECTION

PATENT NO. : 6,044,156
DATED : March 28, 2000
INVENTOR(S) : Chris W. Honsinger, et al.

It is certified that error appears in the above-identified patent and that said Letters Patent is hereby corrected as shown below:

Column 7, line 26, "rampradius." should read --ramp_radius--
Column 7, line 28,    "         "       "      "    "       "
Column 7, line 36,    "         "       "      "    "       "
Column 7, line 36,    "         "       "      "    "       "

Signed and Sealed this

Twentieth Day of February, 2001

Attest:

NICHOLAS P. GODICI

Attesting Officer

Acting Director of the United States Patent and Trademark Office